United States Patent
Eboli, Jr. et al.

(10) Patent No.: US 10,202,066 B2
(45) Date of Patent: Feb. 12, 2019

(54) SELECTIVELY ORIENTABLE HEADLIGHT GUARD

(71) Applicant: Omix-Ada, Inc., Suwanee, GA (US)

(72) Inventors: Alain M. Eboli, Jr., Suwanee, GA (US); Patrick W. Bennett, Gainesville, GA (US); Amir Rahbaripour, Johns Creek, GA (US)

(73) Assignee: OMIX-ADA, INC., Sunwanee, GA (US)

(*) Notice: Subject to any disclaimer, the term of this patent is extended or adjusted under 35 U.S.C. 154(b) by 18 days.

(21) Appl. No.: 15/403,902

(22) Filed: Jan. 11, 2017

(65) Prior Publication Data

US 2018/0194271 A1    Jul. 12, 2018

(51) Int. Cl.
*B60Q 1/00* (2006.01)
*F21S 45/10* (2018.01)

(52) U.S. Cl.
CPC ............ *B60Q 1/0005* (2013.01); *F21S 45/10* (2018.01)

(58) Field of Classification Search
CPC ................................. B60Q 1/005; F21S 45/10
See application file for complete search history.

(56) References Cited

U.S. PATENT DOCUMENTS

| | | |
|---|---|---|
| 4,671,552 A | 6/1987 | Anderson et al. |
| 4,842,319 A | 6/1989 | Ziegler et al. |
| D432,064 S | 10/2000 | Hartog |
| D507,845 S | 7/2005 | Wade et al. |
| D533,678 S | 12/2006 | Conrad |
| 7,249,875 B1 | 7/2007 | Roach et al. |
| D583,502 S | 12/2008 | Schuler |
| 8,714,796 B2 | 5/2014 | Koshiba |
| 8,967,315 B1 | 3/2015 | Lescallett |
| D726,596 S | 4/2015 | Tsukui et al. |
| 2002/0172049 A1* | 11/2002 | Yueh ............... F21V 15/02 362/376 |
| 2005/0083692 A1* | 4/2005 | Leen ............... F21S 8/08 362/223 |

\* cited by examiner

*Primary Examiner* — Anabel Ton
(74) *Attorney, Agent, or Firm* — The Dobrusin Law Firm, P.C.; Daniel P. Aleksynas

(57) ABSTRACT

A selectively orientable headlight guard is disclosed for a vehicle having a headlight assembly. The headlight assembly includes a headlight and a plurality of attachment locations around the headlight. The headlight guard has a cage configured to overlie and protect the headlight. Attachment features on the guard are configured to allow the guard to be attached to the headlight assembly in a first orientation relative to the headlight or alternately in a second orientation different from the first orientation relative to the headlight. The attachment features may be associated groups of openings, arced slots, or a separate attachment ring or attachment lugs. The headlight guard can be attached such that the cage is oriented in at least two different directions relative to the headlight to alter the aesthetics of the headlight and headlight guard.

23 Claims, 7 Drawing Sheets

SELECTIVELY ORIENTABLE HEADLIGHT GUARD

TECHNICAL FIELD

This disclosure relates generally to automotive accessories and more specifically to headlight guards often used to protect the headlights of an off-road vehicle.

BACKGROUND

Many owners and drivers of off-road vehicles such as Jeep® brand vehicles choose to enhance their stock vehicles with aftermarket accessories. Such accessories might include, for example, driving lights, snorkels, winches, wheels, suspensions, special ruggedized tires, and the like. While some off-road accessories are decorative, most serve the purpose of enhancing the resiliency and survivability of the vehicle when it is driven on very demanding and often punishing off-road terrain.

One accessory often added to an off-road vehicle is protective guards that partially cover headlights, tail lights, and other lights with bulbs or lenses subject to being broken by flying debris or impact. Headlights can be particularly vulnerable since on most off-road vehicles, the headlights are relatively large and positioned on the front of the vehicle where they are particularly vulnerable to impact and breakage. A broken or non-functioning headlight can be unsafe, particularly in remote locations at night when it is important for a driver to see the path ahead and be seen by other off-roaders nearby.

Numerous protective guards have been developed that at least partially cover the headlights of off-road vehicles. Most such guards include some type of cage that covers the headlight to deflect debris that might otherwise shatter the headlight. For example, a guard may have a circular base that mounts around a headlight and two or more bars that span the base and overlie the headlight. Some headlight guards are grills with crisscrossing bars that cover the headlight or screens having a rugged mesh that covers the headlight. Prior art headlight guards mount to a vehicle in only one orientation; that is, with their bars or mesh extending horizontally and/or vertically. For a variety of reasons including aesthetics, owners of off-road vehicles may wish to change the orientation of the bars and/or mesh covering their vehicle's headlights. This is not possible with prior art guards.

A need exists for a headlight guard for off-road vehicles that can be installed with the protective bars and/or mesh oriented in a desired direction other than vertically or horizontally. A further need exists for a headlight guard for off-road vehicles that allows for selective orientation or changes in orientation of the cage by a vehicle owner once the guard is mounted to a vehicle. It is to the provision of a selectively orientable headlight guard that meets these and other needs that the present invention is primarily directed.

SUMMARY

Briefly described, a selectively orientable headlight guard according to one embodiment of the invention includes a peripheral ring sized to surround a headlight of an off-road vehicle. A pair of spaced apart arched ribs is attached to the peripheral ring and each extends across its central opening to form a protective cage. The peripheral ring includes an outwardly projecting flange or flanges provided with a plurality of circumferentially spaced apart mounting openings sized to accommodate mounting screws. A first associated group of the mounting openings may be used to attach the headlight guard in one orientation to a headlight with the bars of the cage extending in a first direction relative to the headlight. A second associated group of the mounting openings may be used to attach the headlight guard in a different orientation to a headlight with the bars of the cage extending in a second direction different from the first direction relative to the headlight. In this way, the headlight guard of the present invention may be said to be selectively orientable.

Accordingly, a selectively orientable headlight guard is now provided for off-road vehicles that can be mounted in more than one orientation according to the aesthetic desires of a vehicle owner. These and other features, objects, and advantages will be understood better upon review of the detailed description set forth below taken in conjunction with the attached drawing figures, which are briefly described as follows.

DETAILED DESCRIPTION

Figure 1:
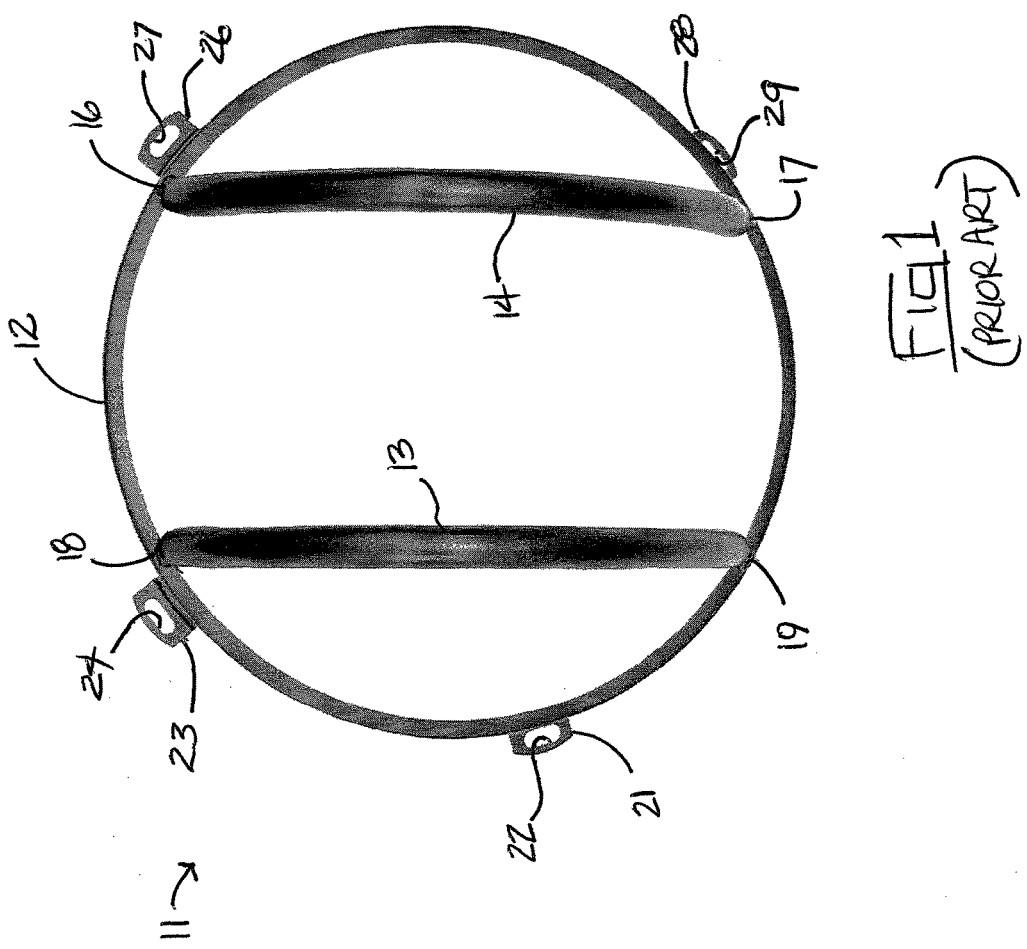
FIG. 1 is a front elevation view of a prior art headlight guard for off-road vehicles.

Reference will now be made to the attached drawing figures, wherein like reference numerals indicate like parts throughout the several views. FIG. 1 shows a typical prior art headlight guard for an off-road vehicle. The prior art guard 11 has a peripheral rim 12 sized to extend around the outer edge of a headlight. A first bar 13 is secured at 18 and 19 to the peripheral rim 12 by, for example, being welded to the rim. A second bar 14 is secured at 16 and 17 to the peripheral rim and is spaced from the first bar 13. The bars 13 and 14 arch outwardly and together define a protective cage for covering and protecting a headlight from flying debris and impacts.

The prior art headlight guard 11 is configured to be mounted to the headlight assembly of an off-road vehicle in place of a stock retaining ring that normally surrounds the headlight. For this purpose, a plurality of mounting tangs 21, 23, 26, and 28 project outwardly from the peripheral rim 12. Each mounting tang is formed with an opening 22, 24, 27, and 29 respectively that is sized to receive the shank of a mounting screw (not shown). The mounting tangs 21, 23, 26, and 28 are positioned around the peripheral rim 12 so that they align with the same screw holes surrounding a headlight to which the stock retaining ring is normally mounted.

When the tangs are aligned with these screw holes and attached with screws, the bars 13 and 14 are oriented to extend in a single direction, which typically is vertical. Since the screw holes are asymmetric around the headlight, the headlight guard can be mounted in only one orientation.

Figure 2:
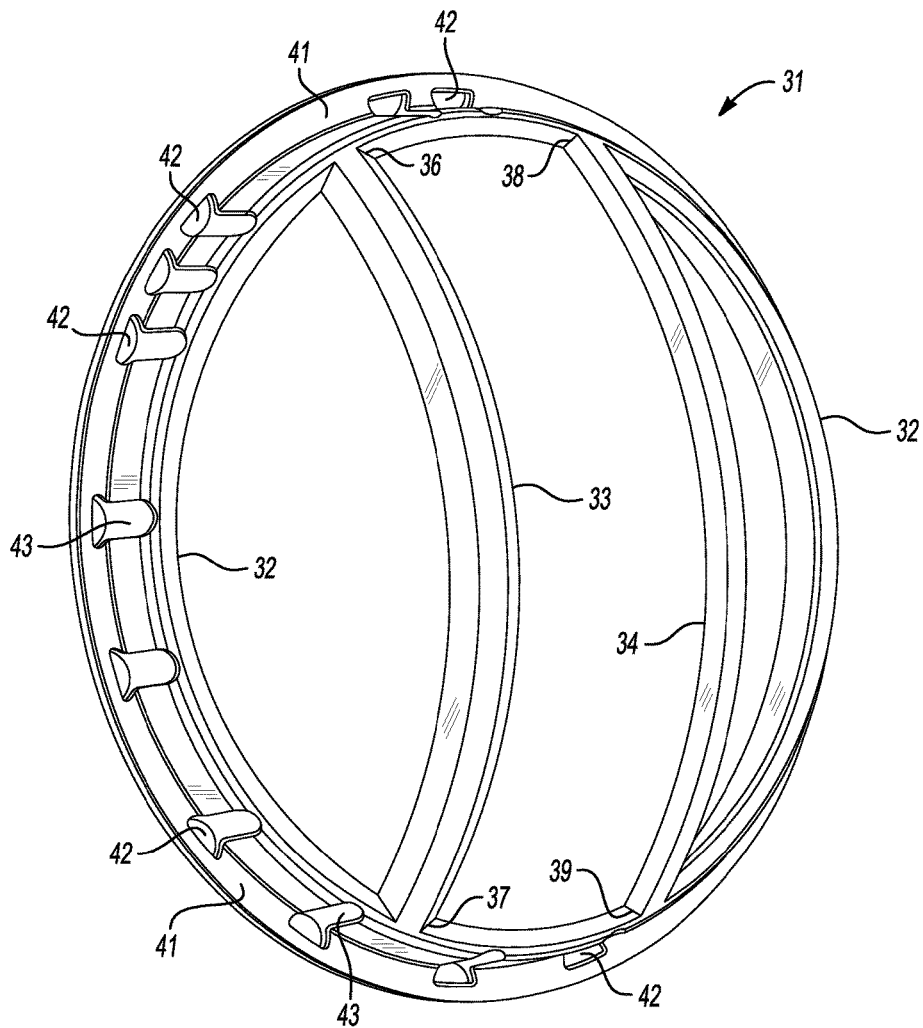
FIG. 2 is a perspective view of a selectively orientable headlight guard for off-road vehicles that embodies principles of the present invention in one preferred form.

FIG. 2 illustrates a selectively orientable headlight guard that embodies principles of the present invention in one preferred form. The headlight guard 31 preferably, but not necessarily, is cast as a unitary structure made of metal such as aluminum or steel. The guard 31 has a peripheral rim 32 sized to extend around the periphery of a headlight of a headlight assembly to which it is mounted. A first bar 33 is fixed to the peripheral rim 32 at locations 36 and 37 and extends across the central opening formed by the peripheral rim. A second bar 34 is fixed to the peripheral rim at 38 and 39 and extends across the central opening in spaced parallel relationship to the first bar 33. The bars 33 and 34 are arched outwardly as shown and together form a protective cage that helps protect a headlight from flying debris and impacts.

An annular flange 41 projects radially outwardly from the base of the peripheral rim 32. A plurality of spaced apart openings 42 are formed through the annular flange 41 as spaced intervals around the peripheral rim 32. The openings are sized to receive attachment screws. The sides of the peripheral rim 32 may be indented as illustrated at 43 to accommodate the heads of attachment screws when the headlight guard is mounted to the headlight assembly of a vehicle.

The openings 42 are arranged in two or more associated groups of openings around the annular flange 41. Each opening of an associated group of openings is positioned to align with a screw hole in the mounting lugs of a headlight assembly when the headlight guard is rotated to a first orientation. Each opening of another associated group of openings is positioned to align with a screw hole in the mounting lugs when the headlight guard is rotated to a second orientation different from the first orientation. Accordingly, the headlight guard 31 may be mounted to a headlight assembly in one of at least two different orientations by aligning the appropriate associated group of openings with the screw holes and attaching the guard to the headlight structure with screws.

Figure 3:
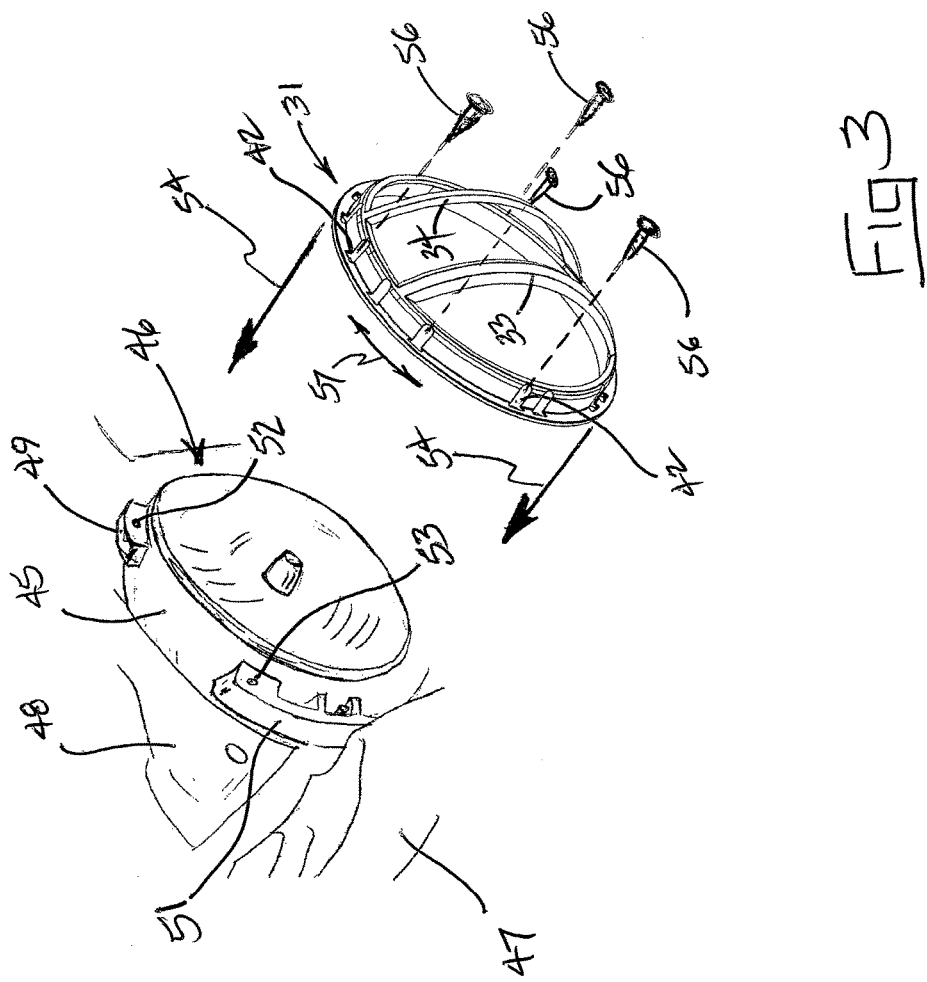
FIG. 3 is a perspective exploded view illustrating installation of the selectively orientable headlight guard of FIG. 2 in one desired orientation.

FIG. 3 illustrates the process of mounting the selectively orientable headlight guard to the headlight assembly of an off-road vehicle in a first selected orientation. In this selected orientation, the bars 33 and 34 of the headlight guard are oriented substantially vertically over the headlight when the guard is secured in place. A headlight assembly 46 of an off-road vehicle such as a Jeep® brand vehicle generally includes a headlight secured within a housing 45 that, in turn, is secured to the vehicle. The housing 45 typically is formed with two or more outwardly projecting bosses (bosses 49 and 51 are visible in FIG. 3). The mounting bosses include screw holes 53 that are positioned around the housing. In a stock vehicle, the screw holes receive screws with which a stock retaining ring (not shown) is mounted. The stock retaining ring surrounds the periphery of the bulb and helps secure the bulb in place.

Figure 4:
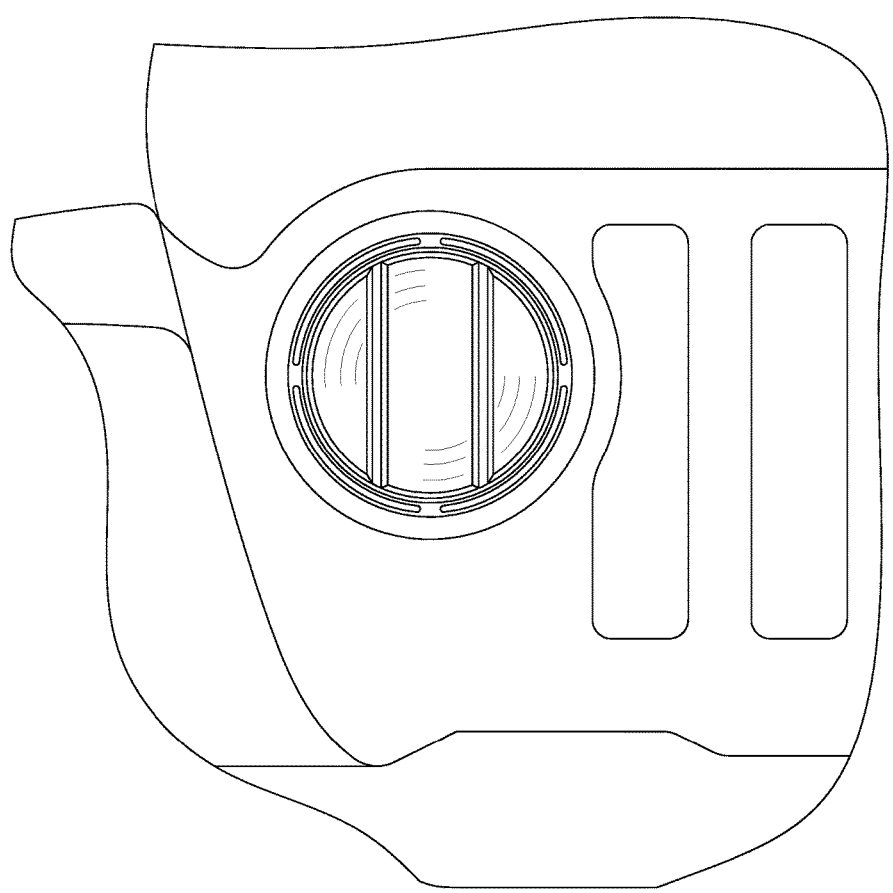
FIG. 4 is a front elevation view showing a headlight of an off-road vehicle with the headlight guard installed as shown in FIG. 3.

In FIG. 3, the grill of the vehicle has been removed to expose the headlight assembly and the stock retaining ring has been removed in preparation for mounting the headlight guard 31 to the headlight assembly 46. The headlight guard 31 is rotated as indicated by arrows 57 until the bars 33 and 34 of the cage are oriented in a first desired direction; which in FIG. 3 is vertical. In this orientation, one associated group of openings 42 align with the screw holes 53 in the headlight assembly. The headlight guard is then moved into place over the headlight bulb as indicated by arrows 54 and attachment screws 56 are extended through the openings of the associated group of openings and threaded into the aligned screw holes 53. The grill of the vehicle may then be replaced. In this way, the headlight guard 31 is securely mounted with the bars of its cage extending in a vertical direction across the bulb of the headlight. Such an orientation of the headlight guard is shown in FIG. 4.

Figure 5:
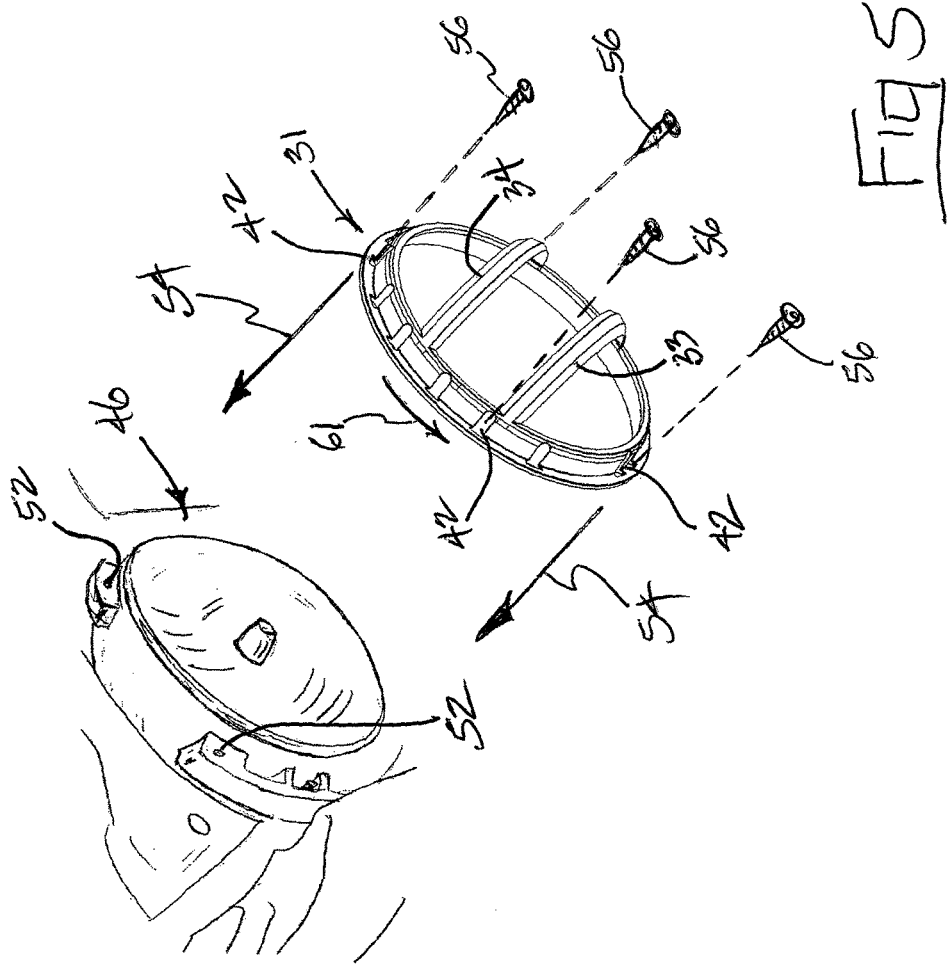
FIG. 5 is a perspective exploded view illustrating installation of the selectively orientable headlight guard of FIG. 2 in an alternate desired orientation.
Figure 6:
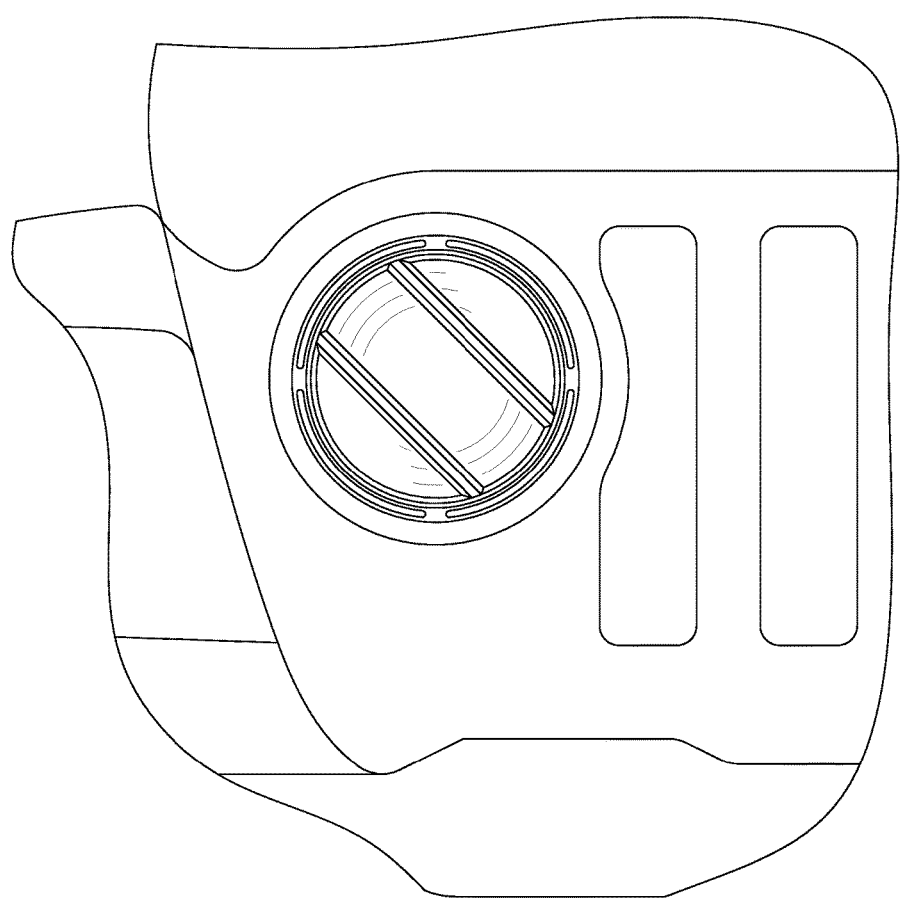
FIG. 6 is a front elevation view showing a headlight of an off-road vehicle with the headlight guard installed as shown in FIG. 5.

FIG. 5 shows mounting the headlight guard 31 to the headlight assembly 46 in an alternate orientation. Here, the headlight guard 31 has been rotated as indicated by arrow 61 until another associated group of openings 42 align with the screw holes 52 in the headlight assembly. In this orientation, the bars of the cage are oriented in a direction between vertical and horizontal; i.e. they extend in a slanted direction. With the headlight guard so oriented, it is moved into place covering the headlight as indicated by arrows. Attachment screws 56 are then extended through the openings of the second associated group of openings and threaded into the screw holes 52 of the headlight assembly. The headlight guard is thus securely mounted to the headlight assembly with the bars of its cage overlying and protecting the headlight. However, the bars here are now oriented in a slanted rather than a vertical direction, as illustrated in FIG. 6, which presents a distinctly different aesthetic from the vertically oriented bars shown in FIG. 4.

Figure 7:
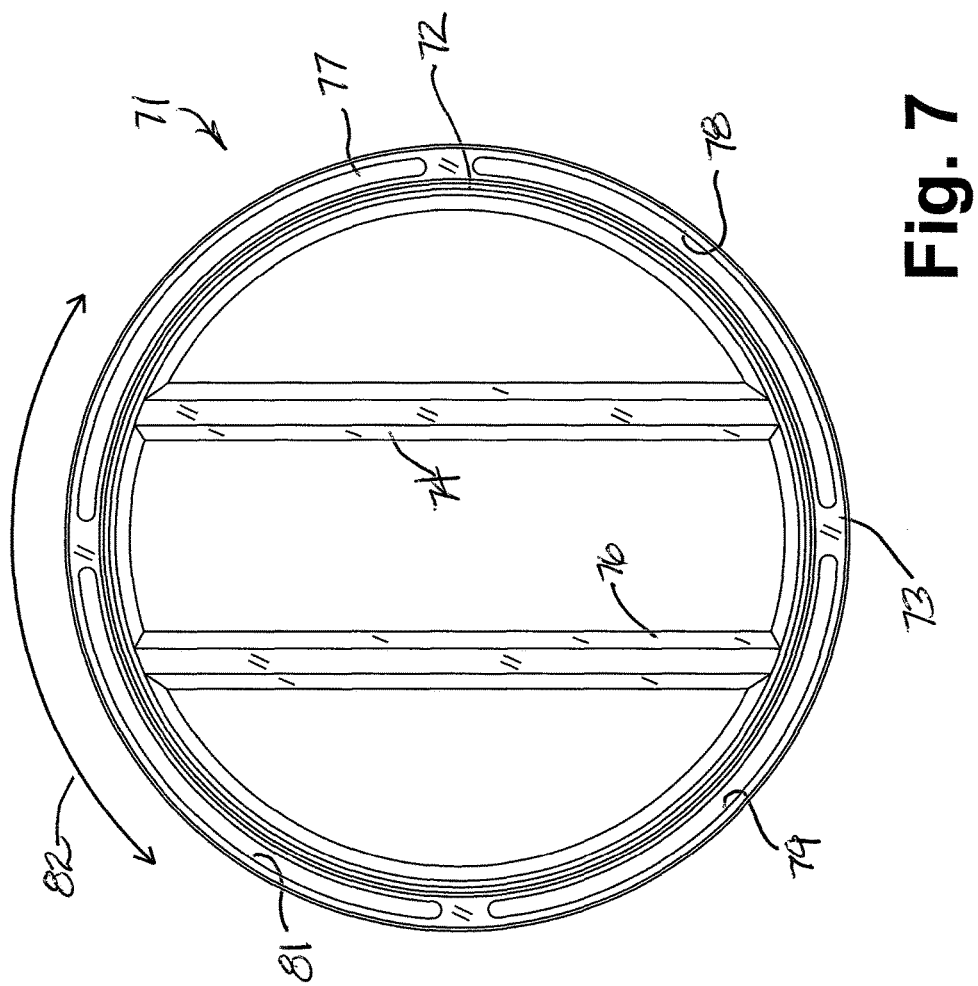
FIG. 7 is a front elevation view of a selectively orientable headlight guard with alternate attachment structures in the form of arched slots.

FIG. 7 illustrates a selectively orientable headlight guard with attachment structures different from the associated groups of openings described above. Here, the headlight guard 71 includes a peripheral rim 72 across which bars 74 and 76 extend to form a protective cage. An annular flange 73 projects outwardly from the peripheral rim. A plurality of arced slots 77, 78, 79, and 81 are formed through the annular flange 73 and are arrayed around the peripheral rim in a circular array. To attach this embodiment of the selectively orientable headlight guard to a headlight assembly, the guard is first positioned over the headlight. Fasteners such as screws are extended through the arced slots and threaded loosely into the screw holes of the headlight assembly. With the screws loosely threaded, the headlight guard can be rotated as indicated by arrows 82 until the bars 74 and 76 are oriented in a desired direction. For example, the bars may be oriented in a vertical direction, a horizontal direction, or at an angle. The screws are then tightened, which secures the guard to the headlight assembly in the desired orientation.

The invention has been illustrated and described herein in the context of preferred embodiments and methodologies considered by the inventors to represent the best mode of carrying out the invention. However, the forgoing description is provided as an illustration only. A wide gamut of additions, deletions, and modifications, both subtle and gross, might well be made to the illustrative embodiments within the scope of the invention. For example, while the protective cage is formed by two spaced apart bars in the illustrations, it might just as well be formed by more bars, by crisscrossing bars, or by a screen or mesh. Any appropriate cage configuration is considered to be within the scope of the invention.

In addition, while associated groups of openings are formed in a continuous annular flange in the illustrated embodiments, they might as well be formed in associated groups of independent tangs projecting outward from the peripheral rim of the guard. The arced slots of the second embodiment are shown symmetrically arranged in FIG. 7. However, they may be configured otherwise and in different numbers. The headlight guard may alternately comprise two pieces that might include a mounting ring or mounting lugs that are secured to the headlight assembly and a guard captured by the ring or lugs. In such an embodiment, the guard might include a narrow annular flange that is captured by the mounting ring or the mounting lugs. With the mounting ring or lugs loosely attached, the guard can be rotated to a desired orientation before being secured by tightening the mounting ring or mounting lugs. These and other modifications might well made by the skilled artisan without departing from the spirit and scope of the invention, which is delineated only by the claims hereof.

What is claimed is:

1. A selectively orientable headlight guard for a vehicle having a headlight assembly, the headlight guard comprising:
   a peripheral rim sized to extend around a headlight of the headlight assembly;
   a protective cage secured to the peripheral rim, the selective cage being configured to overlie and protect the headlight when the headlight guard is mounted to the headlight assembly;
   a plurality of openings surrounding the peripheral rim, the openings being organized into at least a first associated group of openings and a second associated group of openings;
   the openings of the first associated group of openings aligning with attachment points on the headlight assembly when the headlight guard is positioned on the headlight assembly in a first orientation relative to the headlight; and
   the openings of the second associated group of openings aligning with the attachment points on the headlight assembly when the headlight guard is positioned on the headlight assembly in a second orientation different from the first orientation relative to the headlight.

2. A selectively orientable headlight guard as claimed in claim 1 wherein the protective cage comprises at least two spaced apart bars.

3. A selectively orientable headlight guard as claimed in claim 2 wherein each of the at least two spaced apart bars is attached at its ends to the peripheral rim and extends across an open area defined by the peripheral rim.

4. A selectively orientable headlight guard as claimed in claim 3 wherein the at least two spaced apart bars comprises exactly two spaced apart bars.

5. A selectively orientable headlight guard as claimed in claim 1 further comprising an annular flange projecting outwardly from the peripheral rim, the plurality of openings being formed through the annular flange.

6. A selectively orientable headlight guard as claimed in claim 1 wherein the headlight guard is made of a unitary casting of material.

7. A selectively orientable headlight guard as claimed in claim 6 wherein the material is metal.

8. A selectively orientable headlight guard as claimed in claim 1 wherein the protective cage comprises at least two spaced apart substantially parallel bars and wherein the at least two spaced apart bars extend substantially in a vertical direction when the headlight guard is in the first orientation.

9. A selectively orientable headlight guard as claimed in claim 1 wherein the protective cage comprises at least two spaced apart substantially parallel bars and wherein the at least two spaced apart bars extend in a direction different from a vertical direction when the headlight guard is in the second orientation.

10. A selectively orientable headlight guard as claimed in claim 9 wherein the direction different from the vertical direction is angled with respect to the vertical direction.

11. A selectively orientable headlight guard as claimed in claim 10 wherein the angled direction is a direction between the vertical direction and a horizontal direction.

12. A method of attaching a headlight guard to a headlight assembly of a vehicle with a protective cage of the headlight guard overlying a headlight of the assembly, the method comprising the steps of:
   (a) rotating the headlight guard relative to the headlight until the protective cage of the headlight guard is in a first desired orientation relative to the headlight;
   (b) aligning a first associated group of openings on the headlight guard with attachment locations on the headlight assembly while the headlight guard is in the first desired orientation;
   (c) a second associated group of openings on the headlight guard not being aligned with the attachment locations on the headlight assembly when the first associated group of openings are aligned with the attachment locations; and
   (d) fastening the first associated group of openings to the attachment locations on the headlight assembly.

13. The method of claim 12 wherein the cage of the headlight guard comprises parallel bars and wherein step (a) the parallel bars are oriented in a substantially vertical direction in the first desired orientation.

14. The method of claim 12 wherein the cage of the headlight guard comprises parallel bars and wherein step (a) the parallel bars are oriented in a direction other than vertical in the first desired orientation.

15. The method of claim 14 wherein the parallel bars are oriented in a slanted direction in the first desired orientation.

16. The method of claim 12 wherein step (d) comprises extending fasteners through the openings of the first associated group and into the attachment locations.

17. The method of claim 16 wherein the fasteners comprise screws.

18. A headlight guard for a vehicle having a headlight assembly that includes a headlight and a plurality of attachment locations around the headlight, the headlight guard comprising a cage configured to overlie and protect the headlight, a first associated group of openings that align with the plurality of attachment locations for attaching the headlight guard to the headlight assembly when the cage is in a first orientation relative to the headlight and a second associated group of openings that align with the plurality of attachment locations for attaching the headlight guard to the headlight assembly when the cage is in a second orientation different from the first orientation relative to the headlight.

19. A headlight guard for a vehicle having a headlight assembly that includes a headlight, the headlight guard comprising a cage for covering and protecting the headlight and comprising attachment features configured to allow the headlight guard to be selectively secured to the headlight assembly in a first position wherein the cage is in a first orientation relative to the headlight or alternately in a second position wherein the cage is in a second orientation different from the first orientation relative to the headlight.

20. The headlight guard of claim 19 wherein the cage comprises at least two parallel spaced apart bars.

21. The headlight guard of claim 19 further comprising an annular flange surrounding the cage and wherein the attachment features are formed in the annular flange.

22. The headlight guard of claim 21 wherein the attachment features comprise spaced apart openings formed through the annular flange, the openings being arranged in a first associated group for receiving screws when the cage is in the first orientation and a second associated group for receiving screws when the cage is in the second orientation.

23. The headlight guard of claim 21 wherein the attachment features comprise arced slots formed through the annular flange at selected locations thereparound for receiving screws and permitting the headlight guard to be rotated to a desired orientation before the screws are tightened to secure the guard.

* * * * *